(12) United States Patent
Mann et al.

(10) Patent No.: US 7,114,740 B1
(45) Date of Patent: Oct. 3, 2006

(54) FIFTH WHEEL SLIDE RAIL AND RELATED METHOD OF ASSEMBLY

(75) Inventors: Steven William Mann, Gardendale, AL (US); Michael Shane Wolfe, Helena, AL (US); H. Thomas Moulton, Birmingham, AL (US)

(73) Assignee: Fontaine International, Irondale, AL (US)

( * ) Notice: Subject to any disclaimer, the term of this patent is extended or adjusted under 35 U.S.C. 154(b) by 216 days.

(21) Appl. No.: 10/941,136

(22) Filed: Sep. 15, 2004

(51) Int. Cl.
*B62D 53/08* (2006.01)

(52) U.S. Cl. ............... 280/438.1; 280/433; 280/441.1; 238/29

(58) Field of Classification Search ............. 280/438.1, 280/433, 441.1; 238/29
See application file for complete search history.

(56) References Cited

U.S. PATENT DOCUMENTS

| | | | |
|---|---|---|---|
| 4,721,323 A | 1/1988 | Czuk | |
| 5,344,173 A * | 9/1994 | Beeler et al. | 280/438.1 |
| 5,449,191 A * | 9/1995 | Cattau | 280/438.1 |
| 5,707,070 A | 1/1998 | Lindenman et al. | |
| 5,765,849 A * | 6/1998 | Moulton et al. | 280/433 |
| 6,592,140 B1 | 7/2003 | Algurera Gallego et al. | |
| 6,682,089 B1 | 1/2004 | McCoy et al. | |
| 6,736,420 B1 * | 5/2004 | Laarman et al. | 280/438.1 |
| 6,793,272 B1 * | 9/2004 | Borugian | 296/184.1 |
| 2003/0001361 A1 * | 1/2003 | Laarman et al. | 280/433 |

\* cited by examiner

*Primary Examiner*—Lesley D. Morris
*Assistant Examiner*—Marlon Arce-Diaz
(74) *Attorney, Agent, or Firm*—Lanier Ford Shaver & Payne PC; George P. Kobler

(57) ABSTRACT

A slide rail assembly for providing adjustable positions for fifth wheel hitches including a slide rail having feet extending downward from the underside of the slide rail, adjacent feet being separated by a detent for receiving a slide locking mechanism, each of the feet having a recesses located at the bottom inside corner of each foot, respecting the assembly. The slide rail also comprises teeth with gaps therebetween, where the gaps are vertically aligned with the recesses.

15 Claims, 4 Drawing Sheets

FIFTH WHEEL SLIDE RAIL AND RELATED METHOD OF ASSEMBLY

BACKGROUND

1. Field

The present invention relates generally to fifth wheel hitches for coupling trailers to tractor trucks, and, in particular, fifth wheel hitches having adjustable positions, and further, to slide rail assemblies for fifth wheel hitches.

2. Description of the Related Art

Fifth wheel hitches for towing a trailer behind a towing vehicle have long been known in the art. Examples of fifth wheel hitches include those disclosed in U.S. Pat. Nos. 4,721,323, 5,449,191, and 5,707,070.

Large over-the-road freight trailers are usually coupled to trucks by means of a fifth wheel assembly whereby the truck rear drive axles directly support a portion of the trailer load burden. Usually, the fifth wheel couple and support point is located along the length of the tractor between the rear drive wheels and the front steering wheels thereby distributing the front trailer load. It is desirable for the fifth wheel coupling to be adjustable in the longitudinal position with respect to the truck to aid in control over distribution of the load.

Typically, a fifth wheel hitch includes a support frame for mounting the hitch to the towing vehicle, such as, for example, to a tractor truck. This support frame includes a pair of base rails that are bolted to the bed and/or frame of the truck, side brackets that are releasably mounted to the base rails and a head support mounted to the side brackets. A head assembly is mounted to the head support by means of a trunnion arrangement allowing for pivotal fore-and-aft movement. The head assembly includes a jaw assembly specifically adapted to releasably engage and hold a kingpin of a trailer desired to be towed by the towing vehicle.

Fifth wheel hitches tend to be adjustable axially with respect to the tractor frame. One way of achieving this feature is attach slide rails to the support frame of the hitch and configure a pedestal, upon which the head assembly is pivotally mounted, to slidably engage the slide rails. The conventional design of these slide rails is nothing more than a flange extending inward of the slide assembly which may be angled metal. The rail is mounted to the support frame by fillet welding and by bolts.

However, the flange-type slide rail, since it is a single layer of material, provides only limited support to resist any upward loads. Further, the welding done to attach the rail to the support frame is time consuming, in addition to providing only a relatively weak attachment. Therefore, a need is identified for a slide to provide increased resistance to upward tending loads. A further need exists for such a slide rail to be manufactured in a reduced amount of time, but with greater strength of attachment to its support frame.

SUMMARY

The present disclosure is directed to a slide rail and a slide rail assembly that satisfies this need.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A slide rail according to the present invention comprises a plurality of feet extending downward from the slide rail's underside. Each of the feet define a recess located on the inside bottom corner such that the recess is open to both the inside surface and the bottom surface of foot. The slide rail also comprises teeth extending to the inside of the slide rail assembly. Between the teeth are gaps that are vertically aligned with the recesses. Each of the gaps have ridges disposed about rims of the gaps on the upper side of the slide rail. The slide rail is attached to a mounting plate by welding within the recesses where the slide rail feet meet the mounting plate.

A further embodiment includes an assembly comprising one or more slide rails as described above and mounted as described above.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1A:
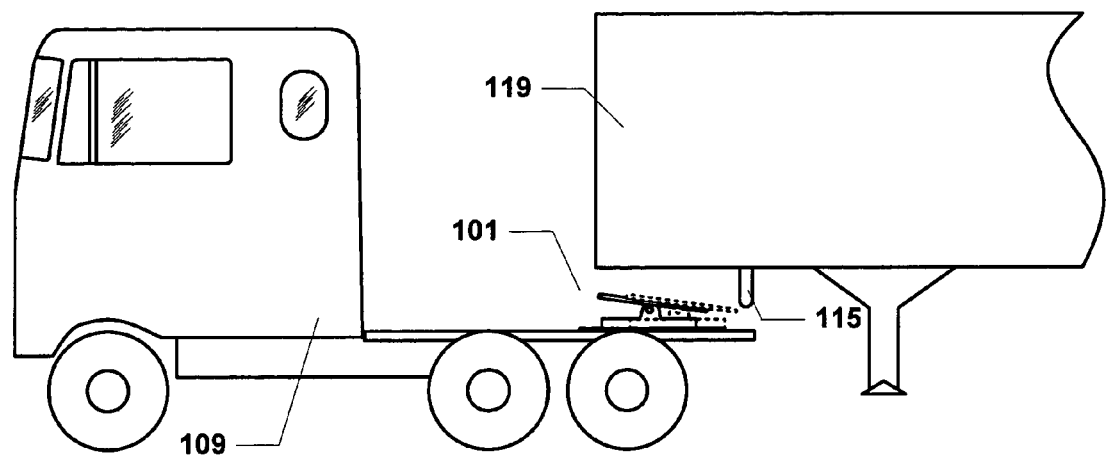
FIG. 1A is an exemplary towing vehicle and trailer to depict general operation of an adjustable fifth wheel hitch assembly.
Figure 1B:
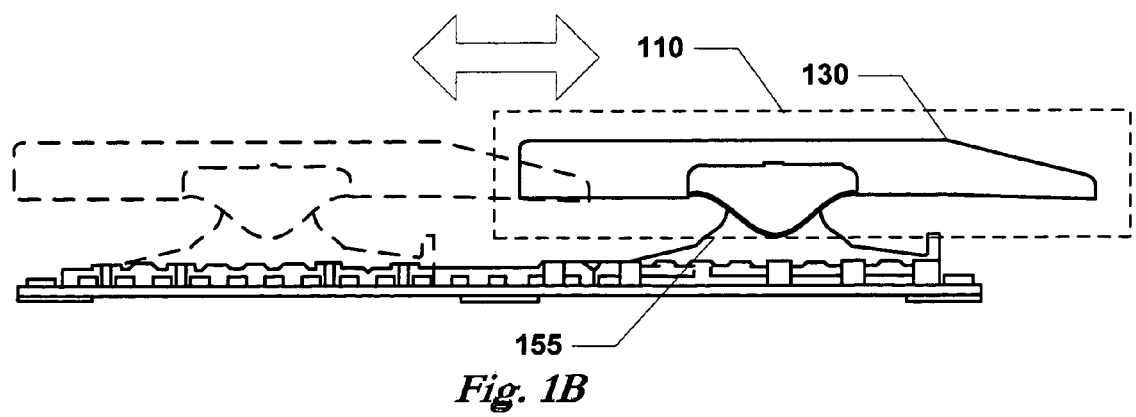
FIG. 1B is a side view of an exemplary fifth wheel hitch assembly showing fore and aft adjustment of such assembly.
Figure 1C:
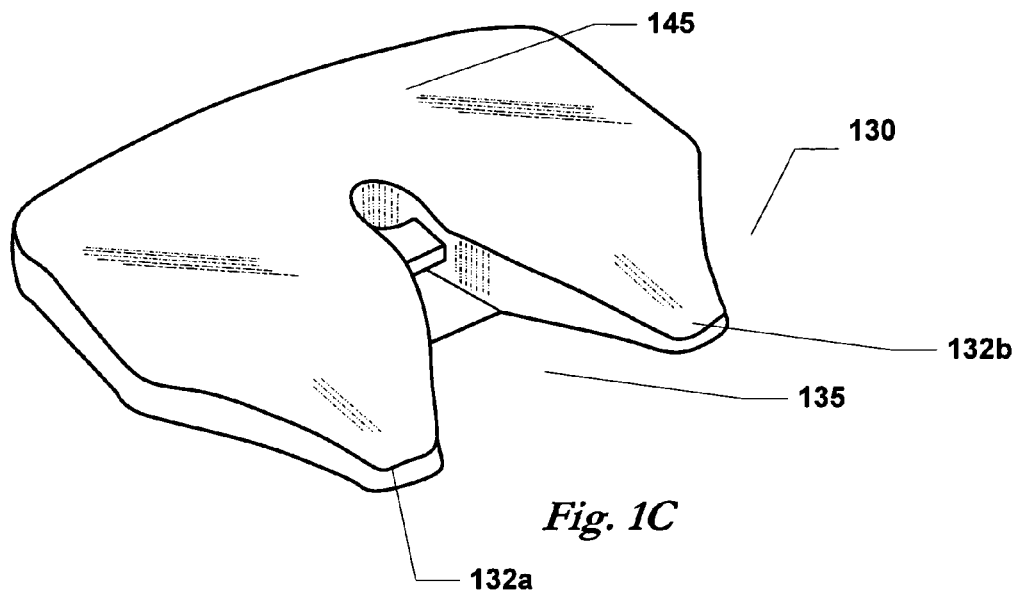
FIG. 1C illustrates an exemplary hitch plate.

The various embodiments of the present invention and their advantages are best understood by referring to FIGS. 1 through X of the drawings. The elements of the drawings are not necessarily to scale, emphasis instead being placed upon clearly illustrating the principles of the invention. Throughout the drawings, like numerals are used for like and corresponding parts of the various drawings.

An adjustable fifth wheel assembly 101 includes a fifth wheel hitch assembly 110 pivotally mounted on moveable pedestal 155. Fifth wheel hitch assembly 110 comprises hitch plate 130 with slot 135 opening toward the aft end of fifth wheel assembly 101 for receiving a king pin 115 from trailer 119. Fifth wheel hitch includes locking mechanism (not shown) to secure king pin within slot 135 for towing. Moveable pedestal 155 is configured with left and right slide flanges 111, 114 and slidably engaged thereby with slide assembly 120 which is mounted to tractor frame. Left and right slide assemblies 120a, b permit longitudinal positioning of fifth wheel hitch assembly 110 with respect to tractor frame.

Figure 1D:
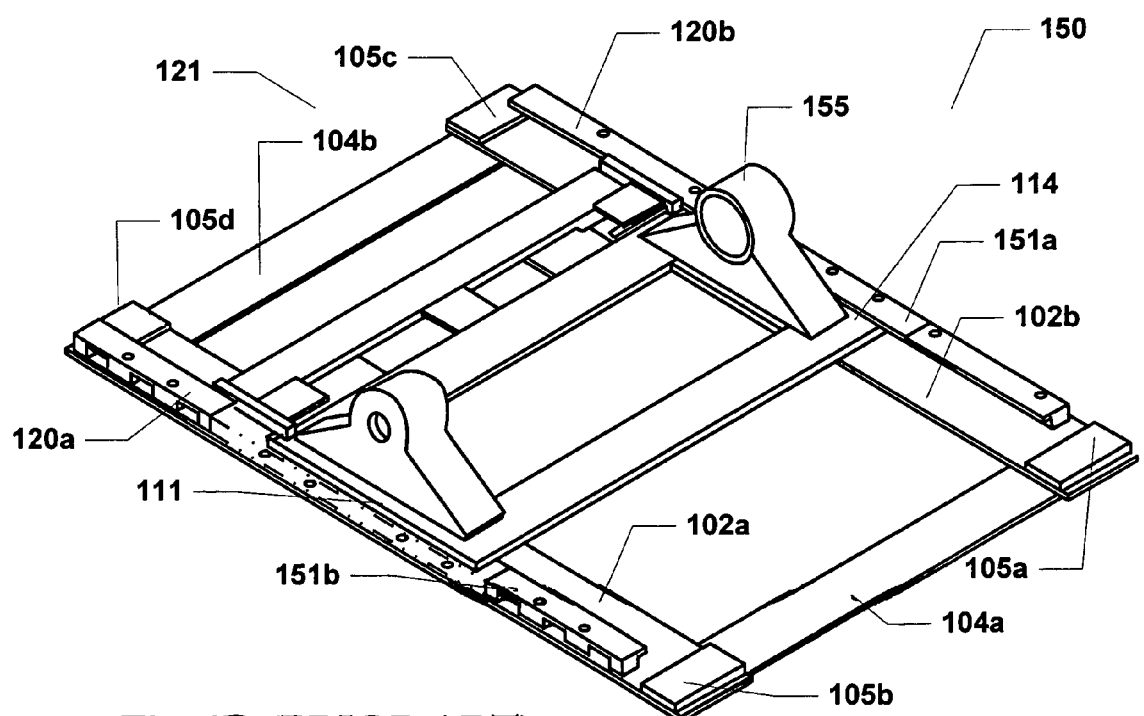
FIG. 1D (PRIOR ART) is an exemplary support for a fifth wheel hitch assembly depicting, inter alia, stop blocks according to the prior art.

FIG. 1D depicts an example of the prior art slide rail where slide rail assembly 120a is comprised of left and right slide rail plates 102a, b tied in parallel by two or more tie bars 104a, b which form slide frame 121. Left slide rail 102a is attached to the upper surface of left slide rail plate 102a and right slide rail 151a is attached to upper surface of right slide rail plate 102b such that fifth wheel hitch assembly 110 and pedestal 155 are located therebetween, inboard of the left and right slide rails 102a, b. Slide rail plates 102a, b and slide rails 151a, b each have longitudinal axes which parallel the longitudinal axis of tractor 109. Slide stop blocks 105a–d are located at each end of each slide rail plate 102a, b. Slide stop blocks 105a–d prevent over travel of pedestal 155. As is shown in the illustration, slide rails 151a, b of the prior art are typically a flange extending inboard of the assembly, slidably receiving flanges 111, 114 of pedestal 155.

Figure 2:
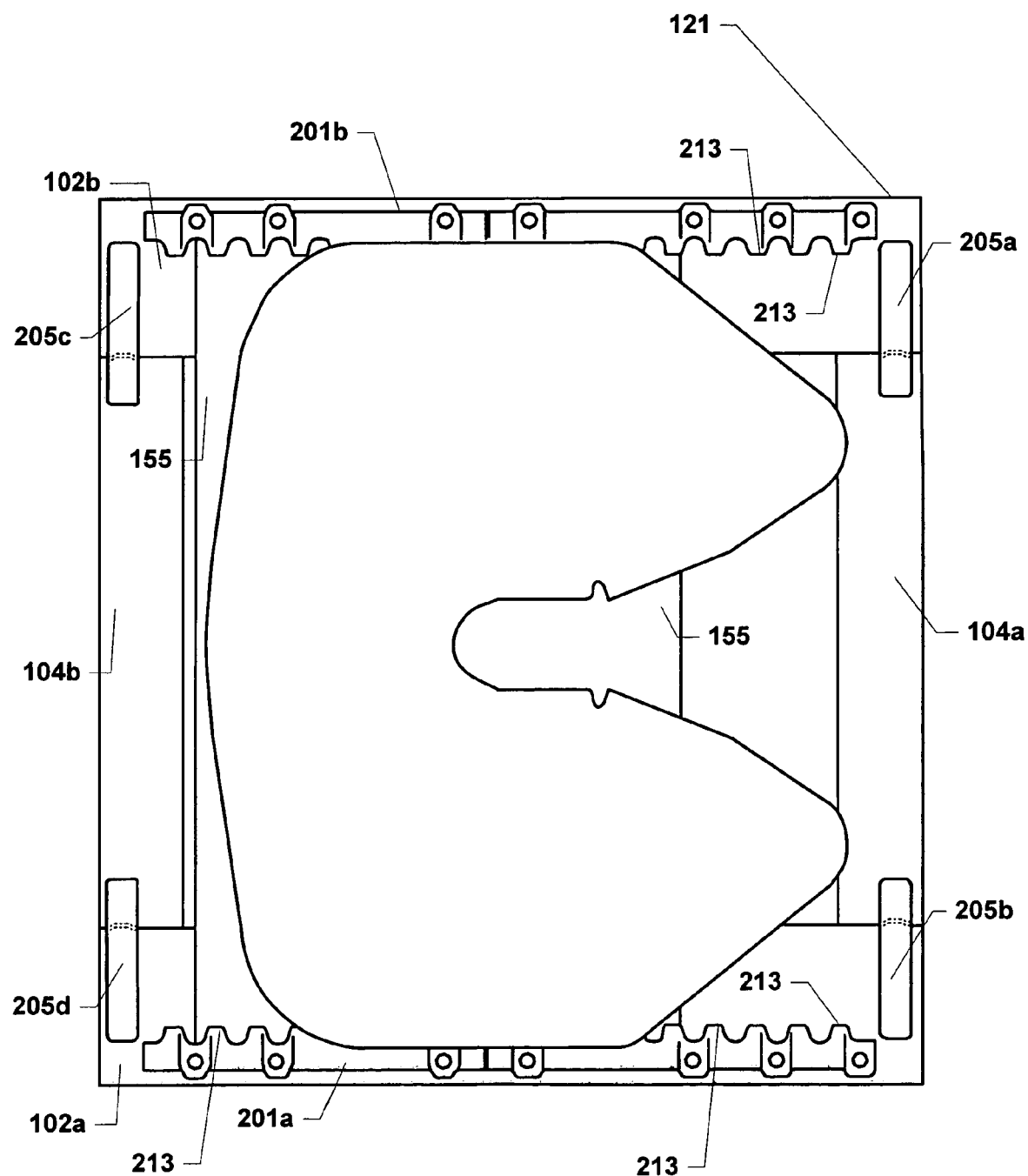
FIG. 2 is the top plan view of an exemplary fifth wheel assembly showing slide rail assemblies according to the present invention.

Referring now to FIG. 2, exemplary slide rail assemblies of the present invention are described where left and right slide rail assemblies 201a, b are shown installed on left and right slide plates 102a, b. In this top view, slide rail 201a, b are shown to comprise a plurality of guide teeth 213 extending inboard of the slide frame 121. Slide rails 201a, b may be cast as a single member, or may be comprised of a plurality of segments, each of said segments being cast steel.

Figure 3:
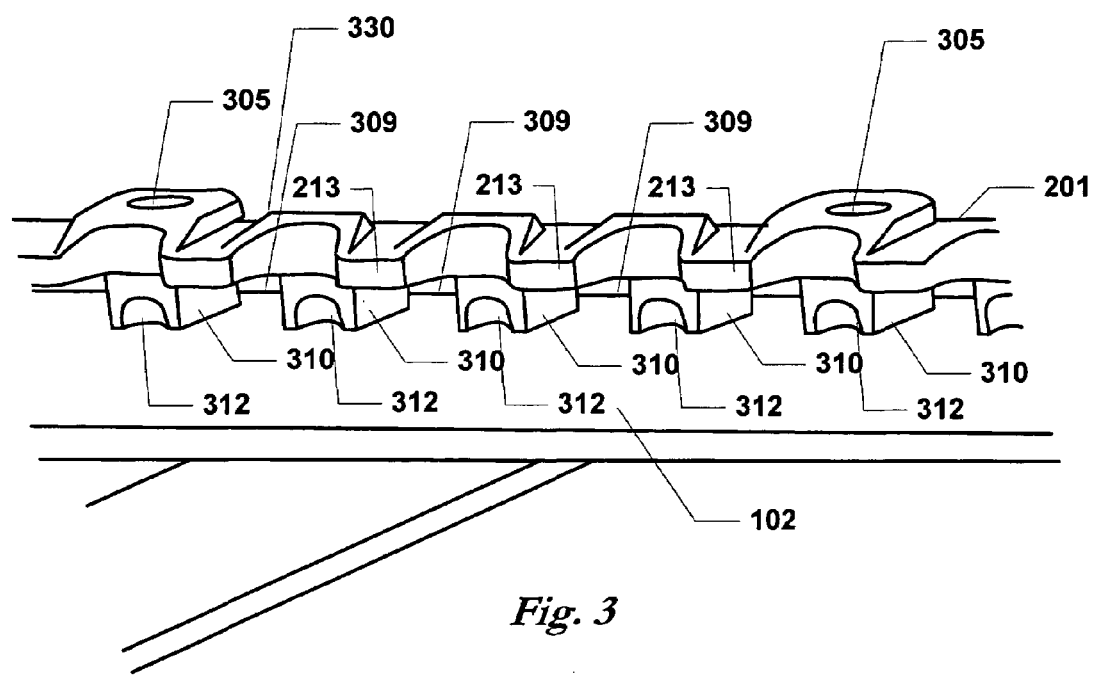
FIG. 3 is an isolated perspective view of a slide rail assembly according to an embodiment of the present invention.

FIG. 3 is a detailed view of a left or right slide rail or a slide rail segment 201 according to the present invention. Slide rail 201 comprises plurality of feet 310 disposed along a line parallel to slide rail's 201 longitudinal axis and extending downward from the underside of the slide rail 201. The slide rail feet 310 are seated upon left slide rail plate 210 when the assembly is complete. Each of the feet 310 possess a cavity 312 located in a bottom corner of each of the feet 310 such that cavity 312 opens to both the inboard and bottom surfaces of each of the feet 310. Between each of the feet 310 is detent space 309 for receiving a slide lock mechanism (not shown) mounted on the pedestal 155 which locks the fifth wheel assembly 130 at the desired longitudinal position relative to tractor.

Guide teeth 213 comprise the upper portion of left slide rail 201 and are disposed longitudinally along slide rail 201 and extend inboard relative to slide frame 121. Guide teeth 213 are separated by gaps and are aligned vertically with detents 309 so that gaps are aligned vertically with feet 310 and cavities 312. Guide teeth 213 provide downward retention of pedestal 155 on slide frame 121 via pedestal flanges 111, 114 and guide the pedestal 155 longitudinally throughout pedestal adjusting movement. Thus, guide teeth 213 take the place of a solid, linear guide lip. Each gap may also comprise a ridge 330 disposed along the rim of gap, preferably being at its highest point along the outward portion of gap, with respect to slide frame 121, and tapering toward the inboard of the slide frame 121. The added material disposed about the rim of gap provides support for guide tooth 313 to resist upward force that may be imparted by movement of pedestal 155.

Left and right slide rails 201a, b are attached to left and right slide plates 102a, b by welding and by fasteners. Advantageously, slide rails 201a, b are welded to slide plates 102a, b at each cavity 312 such that material from cavity 312 is fused with material from slide plate 102. A welding device (not shown) may include a robotic welder, well-known in the relevant arts, that is programmed to apply welds at pre-determined locations, for a pre-determined time and at a pre-determined angle. Thus, gap is vertically aligned with cavity 312 to provide access to a welding device to complete the weld procedure. Preferably, a welding device is allowed to "dwell" within cavity 312 for a period of about 3–5 seconds to allow more weld material to co-mingle and fuse.

This welding technique provides a number of advantages over earlier methods of welding slide rail 201a, b to slide plate 210, 212. Because the welding device is allowed to dwell within the cavity, greater weld penetration is achieved, i.e. more material from the two pieces is fused, which yields a stronger weld. The size of the cavity allows for a larger weld which attaches a greater area of each piece.

Figure 4:
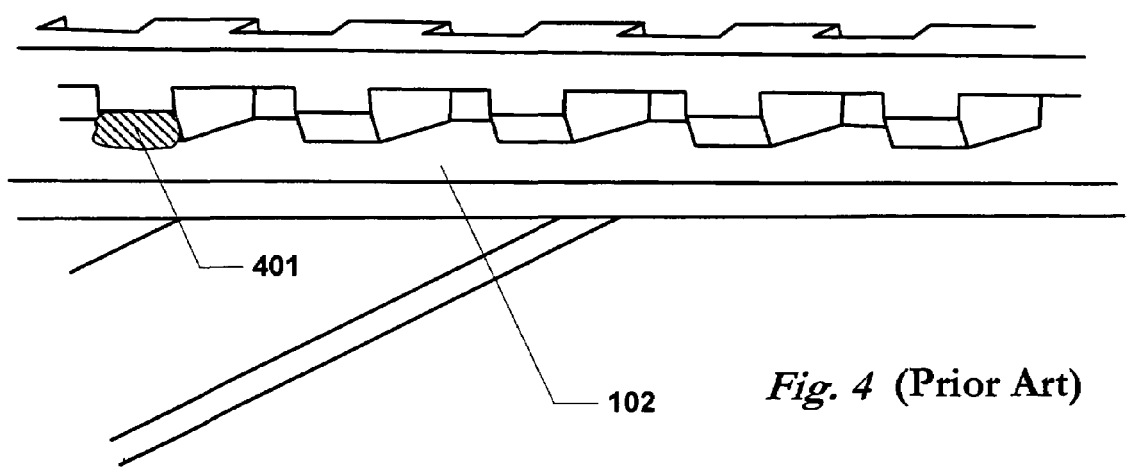
FIG. 4 is an isolated perspective view of a prior art slide rail assembly depicting the prior art welding method used to form the weldments.

At the same time, weld material does not form on the top surface of slide plate 102a, b in the area where left and right flanges 111, 114 of pedestal 155 would travel (the slide area). With the former well-known fillet weld technique an example of which is shown in FIG. 4 (Prior art), weld material 401 forms in the slide area of slide plate 102. This results in rough or inhibited travel of flanges 111, 114 through the slide area and prevents smooth adjustment of pedestal 155. To mitigate against this requires the extra production step of manually grinding away such excess material to maintain a clear slide area, increasing production time and costs.

A further advantage of attaching slide rails with this welding method is that welding within cavity 312 is more accurate than fillet welding, especially when using a robotic welder. Cavity 312 provides a stable target for the welder and the welder is not required to move during application of the weld. As would be appreciated by those skilled in the art with the benefit of reading this disclosure, the use of cavity welding as herein described also results in a faster welding time and thus, further decreasing production time and cost. In addition, gaps allow welder to attack weld at a greater angle with respect to the slide plate 102 thus improving weld penetration.

It should be noted that slide rails 201 could be configured with a solid linear guide lip, see in FIG. 1D, instead of guide teeth 313 and the weld method described above could still be employed. However, those skilled in the relevant arts will recognize that a linear guide lip configuration would required a welder to attack the weld at a shallower angle, therefore reducing the strength of the weld. Further, because of the added material about the rim of gap in slide rail 201 configured with guide teeth 313, the downward support is greater than that exhibited by the linear lip configuration.

Slide rail 201 is also secured to slide plate 210, 212 by fasteners inserted through mounting apertures 305a, b & c which align with corresponding apertures (not shown) through slide plate 102. Mounting apertures 305 are preferably defined within slide rail 201 where mounting aperture 305 is bored into top of slide rail and through foot 310.

Slide rail 201 can be a–d, 202a–d single cast piece or can be comprised of a plurality of slide rail segments. The number of slide rail segments that comprise slide rail 201 may vary depending upon design requirements. Similarly, slide rail segments may be of various lengths depending upon design requirements. During production, slide rail segments are not only affixed to slide plates 102 as described above, but also butt-welded to together where the respective abutting ends meet to form a stronger bond. For towing applications involving large tractor-trailer rigs, slide rail segment should be between about twelve (12) inches and about sixteen (16) inches.

As described above and shown in the associated drawings, the present invention comprises an apparatus for a fifth wheel slide rail and relate method of assembly. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

We claim:

1. A slide rail for providing adjustable positions for fifth wheel couplings, said slide rail having upper and lower portions, a top and a bottom, and an inboard side, said lower portion having a plurality of feet extending downward therefrom, adjacent feet being separated by a detent, and said upper portion having a plurality of guide teeth disposed longitudinally along said inboard side, comprising a recess located in a bottom inboard corner of each of said plurality of feet opening in both inboard and bottom surfaces of said feet, and wherein each of said feet are secured to a plate by applying a weld in each of said recesses.

2. The slide rail of claim 1, wherein said slide rail further comprises a plurality of gaps between adjacent teeth, each of said gaps being aligned in a vertical plane above each of said recesses.

3. The slide rail of claim 2, wherein said slide rail has an outboard side and each of said gaps having a rim, and further comprises, a ridge disposed along said rim of said gap.

4. The slide rail of claim 2, wherein said ridge has greater thickness toward the outboard portion of said rim than the inboard sides of said rim.

5. The slide rail of claim 4, further comprising at least two bore holes, each of said at least two bore holes extending through one of said feet from the top to the bottom whereby bolts are inserted through said bore holes and through corresponding apertures within said slide plate.

6. A slide rail assembly for providing lockable, non-permanent positions for fifth wheel coupling assemblies comprising:
   a. first and second slide rails, each having an upper and a lower side, said lower side having a plurality of feet disposed generally uniformly thereon, adjacent feet being separated by a detent, each of said plurality of feet having a recess opening in an inboard and a bottom surface; and
   b. first and second slide rail mounting plates for mounting said first and second slide rails, respectively, onto a tractor frame and to which said feet are attached, said mounting plates being tied by a transverse member; and where said each of said feet of said first and second slide rails are attached to said first and second slide rail mounting plates by welding within each of said recesses.

7. The slide rail assembly of claim 6, wherein said first and second slide rails comprise a plurality of teeth extending inwardly in relation to said slide rail assembly along said upper portion, adjacent teeth being separated by gaps therebetween, each of said gaps being aligned in a vertical plane above each of said recesses.

8. The slide rail assembly of claim 7, wherein said first and second slide rails have an outboard sides and each of said gaps has a rim, and further comprises, at each of said gaps, a ridge at the outboard rim of a said gap.

9. The slide rail assembly of claim 8, wherein said ridge has greater thickness toward the outboard portion of said rim than the inboard sides of said rim.

10. The slide rail assembly of claim 9, wherein each of said first and second slide rails further comprise at least two bore holes, each of said at least two bore holes extending through one of said feet from the top to the bottom whereby bolts are inserted through said bore holes and through corresponding apertures within said slide plate.

11. The slide rail assembly of claim 6, wherein first and second slide rails are comprised of a plurality of slide rail segments.

12. The slide rail assembly of claim 11, wherein said first and second slide rails comprise a plurality of teeth extending inwardly in relation to said slide rail assembly along said upper portion, adjacent teeth being separated by gaps therebetween, each of said gaps being aligned in a vertical plane above each of said recesses.

13. The slide rail assembly of claim 12, wherein said first and second slide rails have an outboard sides and each of said gaps has a rim, and further comprises, at each of said gaps, a ridge at the outboard rim of a said gap.

14. The slide rail assembly of claim 13, wherein said ridge has greater thickness toward the outboard portion of said rim than the inboard sides of said rim.

15. A method for attaching a fifth wheel slide rail to a mounting substrate, said slide rail having a lower portion, and having a plurality of feet disposed along said lower portion, each of said feet having a recess in a bottom corner of each of said feet, said method comprising:
   fusing material of each of said feet within each of said recesses with material of said mounting substrate.

* * * * *